United States Patent
Lewin et al.

[19]

[11] Patent Number: 5,840,266
[45] Date of Patent: Nov. 24, 1998

[54] DEHYDRATION OF FLUORIDE MIXTURES

[75] Inventors: Robert Glyn Lewin, Bury; Graham Hodgson, Lancashire, both of United Kingdom

[73] Assignee: British Nuclear Fuels plc - Springfield Works, United Kingdom

[21] Appl. No.: 928,133

[22] Filed: Sep. 12, 1997

Related U.S. Application Data

[63] Continuation of Ser. No. 629,331, Apr. 8, 1996, abandoned, which is a continuation of Ser. No. 395,657, Feb. 28, 1995, abandoned, which is a continuation of Ser. No. 182,945, Jan. 18, 1994, abandoned.

[30] Foreign Application Priority Data

Jan. 19, 1993 [GB] United Kingdom ............... 9300956

[51] Int. Cl.$^6$ .............................. C01B 7/19; C25D 21/18
[52] U.S. Cl. .......................... 423/483; 205/99; 205/101; 423/488
[58] Field of Search ................................. 423/483, 484, 423/488, 481; 205/98, 99, 101

[56] References Cited

U.S. PATENT DOCUMENTS

| 1,914,425 | 6/1933 | Henglein et al. ................. 423/483 |
| 3,140,152 | 7/1964 | Rucker et al. ..................... 423/483 |
| 3,655,525 | 4/1972 | Childs ............................... 205/460 |
| 4,056,604 | 11/1977 | Thompson et al. .............. 423/483 |

FOREIGN PATENT DOCUMENTS

| 539893 | 5/1993 | European Pat. Off. ........... 423/484 |
| 254372 | 2/1988 | German Dem. Rep. .......... 423/484 |
| 58-84117 | 5/1983 | Japan . |
| 979271 | 12/1982 | U.S.S.R. ............................. 423/488 |
| 90-00521 | 1/1990 | WIPO ................................. 423/484 |

*Primary Examiner*—Ngoc-Yen Nguyen
*Attorney, Agent, or Firm*—Nixon & Vanderhye

[57] ABSTRACT

A process for the treatment of a hydrated mixture of a salt which comprises an inorganic fluoride and hydrogen fluoride to remove water from the mixture wherein the salt mixture contains an excess of hydrogen fluoride, which process comprises forming a liquid phase of the said mixture by melting the salt therein and feeding an inert gas through the liquid phase of the mixture.

13 Claims, 1 Drawing Sheet

DEHYDRATION OF FLUORIDE MIXTURES

This is a Rule 62 File Wrapper Continuation of application Ser. No. 08/629,331, filed 8 Apr. 1996, now abandoned, which is a continuation of Ser. No. 08/395,657 filed Feb. 28, 1995 now abandoned which is a continuation of 08/182,945 filed Jan. 18, 1994, now abandoned.

The present invention relates to the dehydration of mixtures especially hydrated mixtures of one or more salts which comprise an inorganic fluoride and hydrogen fluoride.

BACKGROUND OF THE INVENTION

Mixtures of the type specified are employed as electrolytes in electrolytic cells for the production of fluorine. During storage or during use as an electrolyte such mixtures can become contaminated by water for various reasons. In many cases it is necessary to dispose of the mixture. Such disposal and the provision of replacement material can be very costly.

A process for the dehydration of mixtures of the type specified is therefore required and prior to the present invention no suitable process been available for commercial use. For example, in one known process the mixtures have been dried by heating in a tray but this results in the loss of valuable HF with the water. In another example the mixtures have been dried under vacuum but the apparatus required is relatively complex and not easy to scale up into a commercially viable arrangement.

SUMMARY OF THE INVENTION

According to the present invention n process for the treatment of a hydrated mixture of a salt which comprises an inorganic fluoride and hydrogen fluoride to remove water from the mixture wherein the salt mixture contains an excess of hydrogen fluoride, which process comprises forming a liquid phase of the said mixture by melting the salt therein and feeding an inert gas through the liquid phase of the mixture.

The inert gas leaving the said liquid phase carries with it water vapour removed from the said mixture and such gas/water vapour mixture is desirably extracted through a gas outlet from the vessel containing the liquid phase. The vessel may, apart from the gas inlet and outlet, (and optionally a port allowing a device to be inserted to measure the temperature of the melt) be a vessel closed to the outside atmosphere. The water vapour in the inert gas/water vapour mixture may be monitored by a known means, eg a conductivity monitor so that the point in time when all of the water has been removed from the liquid phase may be detected and if appropriate indicated. The gas supply may be shut off at this point in time.

The said salt may comprise potassium fluoride or ammonium fluoride or a mixture of fluorides containing one of these. The said mixture may comprise an electrolyte system comprising KF.xHF where x is approximately 2, eg in the range 1.8 to 2.2. This melts at a temperature of about 70° C. This is the mixture which is formed by the addition of HF to KF.HF.

The melt is desirably maintained at a temperature $\geq 70°$ C., eg a temperature in the range 80° C. to 100° C.

The said gas may be nitrogen or compressed air or argon or any gas which is inert with respect to the system.

The process according to the present invention provides A convenient and commercially applicable process for removing water from electrolytes comprising the said salt/HF mixture, such water resulting from degradation by atmospheric moisture contamination. However, use of the process according to the invention is not limited to treatment of electrolyte materials and may alternatively be applied as follows.

In a particular form of the present invention the said mixture may be obtained by adding together an aqueous solution of hydrogen fluoride and a dry mixed salt system of formula $MF_n.HF$ where M represents a cation and n is the valency of M. For instance $MF_n.HF$ may be KF.HF. The said aqueous solution or hydrogen fluoride may contain up to 60 percent by weight water, this being the concentration reached when the solution is boiled to reach its azeotropic level. Normally, the salt system will be a solid and the aqueous solution will be a liquid when first added together. Addition causes the salt system to dissolve fully in the aqueous solution when heated (eg to a temperature of 80° C. for the KF.2HF system.

In the said particular form of the invention after the water present has been removed from the mixture of the salt system and HF solution the components of the mixture may be separated in a known way to recover dry HF. For example, separation may be carried out by bubbling further gas through the liquid phase mixture and/or heating the liquid phase mixture to drive off or extract HF as a gas. The HF thereby separated may be distilled in a separate vessel. The invention in this form therefore provides a highly convenient process for the conversion of dilute HF solution into anhydrous hydrogen fluoride (containing less than 0.5, desirably less than 0.2 percent by volume water. Dilute hydrogen fluoride solution is a relatively inexpensive material whereas anhydrous HF is relatively expensive. Thus, the invention beneficially allows a presently inexpensive starting material to be converted into a presently expensive product. No alternative economically attractive process for such conversion has been known hitherto.

The said particular form of the invention for conversion of a dilute solution of hydrogen fluoride into anhydrous HF may be carried out as a batch process or alternatively as a semi-continuous process. In the semi-continuous process the water is first removed by sparging the melt comprising the fluoride salt system and aqueous HF solution in a vessel with an inert gas as described above. Then HF may be separated by further sparging and/or raising the melt temperature (eg to between 100° C. and 140° C.). When the melt is denuded of HF further aqueous HF solution may be added to the vessel and the process repeated.

It is highly surprising that drying of mixtures in accordance with the present invention can be carried out without major complications or disadvantages. The concept of removing water preferentially from a system with a substantial concentration of HF by forced evaporation does not appear to be a sensible or viable process. This is because the vapour pressure of HF over aqueous HF solutions at moderate temperatures is substantial. Thus, it would not be unreasonable to expect a large HF component in the vapour phase during evaporation and that forced evaporation would cause substantial losses of HF. In practice, however, experimental results suggest that the partial vapour pressure of water above a HF aqueous solution is much greater than that of HF and that water as the more volatile component may be removed preferentially from the mixture. As demonstrated below the amount of HF lost during extraction of water is surprisingly very low.

Salts comprising $NH_4F$ or $NH_4.F$ which are solid crystals have in the prior art been dried using gases such as air and NH$_3$, eg as described in the prior art in SU 1281516 and SU 850582. However, there has been no prior use of gases for the use of drying molten mixtures which comprise an excess of HF and thereby a substantial vapour pressure of gaseous HF associated with the mixture. For the reason explained above, the fact that such process can be successfully applied to such molten mixtures is highly surprising.

Embodiments of the present invention will now be described by way of example with reference to the accompanying drawings, in which:

DESCRIPTION OF THE PREFERRED EMBODIMENTS

Figure 1:
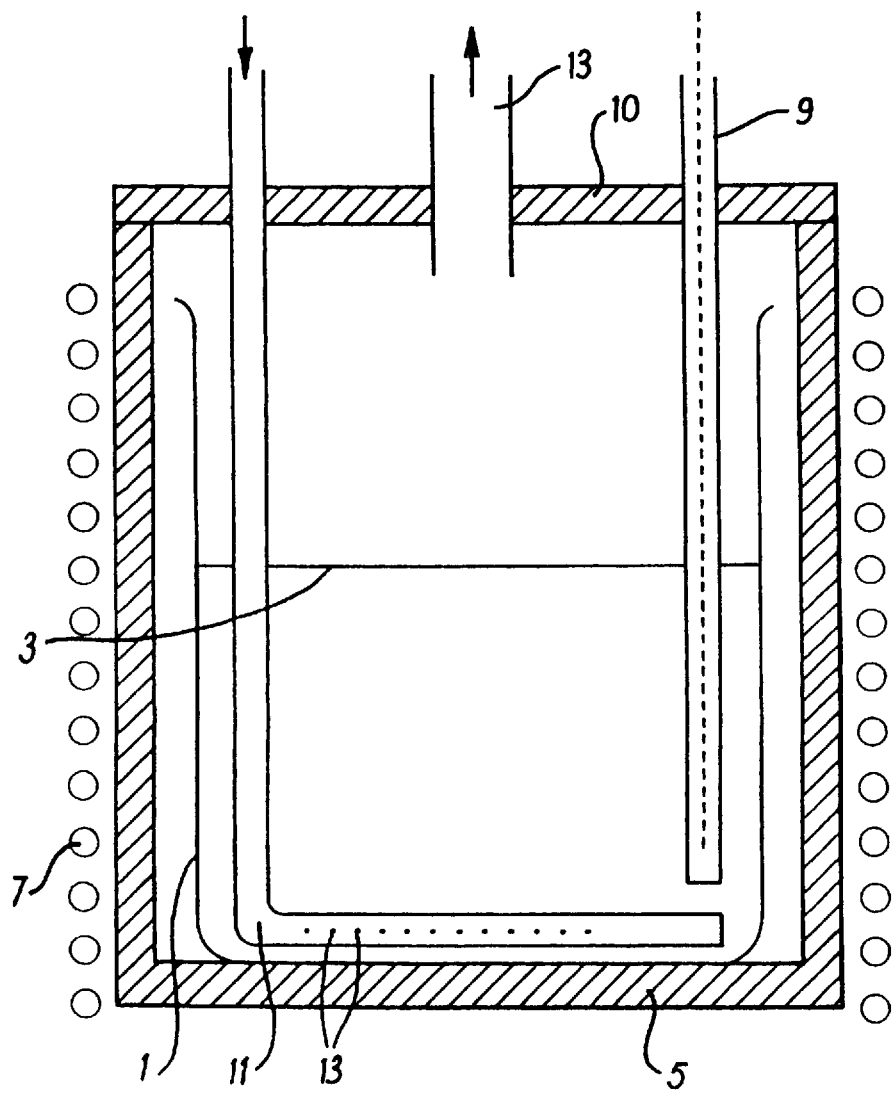
FIG. 1 is a cross-sectional side elevation of apparatus employed to dehydrate an electrolyte mixture.

The apparatus shown in FIG. 1 comprises a polypropylene beaker 1 containing an electrolyte mixture comprising KF.2HF and water the surface level of the electrolyte being indicated by numeral 3. The beaker is contained within a mild steel body 5, and hated by a heating coil 7 and maintained at a temperature of between 70° C. and 100° C. measured by a thermocouple applied via a thermocouple port 9 fitted through the lid 10 of the body 5.

Nitrogen is sparged through the electrolyte mixture in the beaker 1 via a gas sparge pipe 11 fitted through the lid 10, the pipe 11 having bubble holes 13 at its lower end. Nitrogen is applied at a rate of 6 liters per minute and the gas evolved from above the electrolyte level 3 is collected via an outlet 13 fitted into the lid 10 and leading to a condensation until (not shown).

Using the apparatus shown in FIG. 1 experiments were carried out to demonstrate the benefits of the present invention. The drying of three mixtures of KF.2HF containing 10, 16 and 5.8 percent water by mass was carried out and the percentage of water and HF by mass left in the mixture were measured hourly. The results are given in Table 1 to 3 as follows.

TABLE 1

Drying of Wet Electrolyte using a Nitrogen
Purge Initial Water Content: 10% by mass

| Time Hours | Temperature Degrees C. | % Water by Mass | % HF by Mass |
|---|---|---|---|
| 0 | 75 | 10.0 | 40.8 |
| 1 | | | |
| 2 | | | |
| 3 | | | |
| 4 | 83 | 3.6 | 39.9 |
| 5 | 85 | 2.9 | 39.7 |
| 6 | 86 | 2.3 | 39.2 |
| 7 | 88 | 1.5 | 39.2 |

TABLE 2

Drying of Wet Electrolyte using a Nitrogen
Purge Initial Water Content: 16% by mass

| Time Hours | Temperature Degreee C. | % Water by Mass | % HF by mass |
|---|---|---|---|
| 1 | 77.0 | 16.0 | 40.8 |
| 2 | 73.5 | | |
| 3 | 74.6 | | |

TABLE 2-continued

Drying of Wet Electrolyte using a Nitrogen
Purge Initial Water Content: 16% by mass

| Time Hours | Temperature Degreee C. | % Water by Mass | % HF by mass |
|---|---|---|---|
| 4 | 74.6 | | |
| s | 77.0 | | |
| 6 | 77.5 | | |
| 7 | 81.0 | | |
| 8 | 83.0 | | |
| 9 | 82.0 | 4.3 | 39.1 |
| 10 | 84.0 | 3.4 | 38.6 |
| 11 | 86.5 | 2.1 | 38.4 |
| 12 | 89.5 | 0.74 | 37.6 |
| 13 | 91.0 | 0.37 | 37.4 |
| 14 | 90.3 | 0.12 | 37.1 |

TABLE 3

Drying of Weight Electrolyte using a Nitrogen
Purge Initial Water Content: 5.8% by mass

| Time Hours | Temperature Degrees C. | % Water by Mass | % HF by Mass |
|---|---|---|---|
| 0 | 92.5 | 5.81 | 39.5 |
| 1 | 80.7 | 4.47 | 39.2 |
| 2 | 81.8 | 2.79 | 38.8 |
| 3 | 82.8 | 1.67 | 38.5 |
| 4 | 85.3 | 0.97 | 38.2 |
| 5 | 87.1 | 0.94 | 38.1 |
| 6 | 89.1 | 0.56 | 37.8 |
| 7 | 92.6 | 0.49 | 37.6 |
| 7* | 93.5 | 0.13 | 37.4 |
| 8† | 93.1 | 0.69 | 37.4 |
| 9† | 93.8 | 0.53 | 37.2 |
| 9* | 107.8 | 0.10 | 36.9 |
| 10 | 92.8 | 0.05 | 36.6 |
| 11 | 88.0 | 0.05 | 36.2 |
| 12 | 89.8 | 0.05 | 35.8 |

*Resampling after an extended period eg overnight, without gas sparging. Water loss continues since the system is not sealed.
†Suspect slight water contamination of the samples.

The results of HF concentration change (loss) with time appear to describe a linear relationship, with the rate of loss being approximately 0.3% h$^{-1}$. Water loss from the electrolyte with respect to tine is non-linear, which also appears to be dependent upon the concentration of water in the electrolyte at a given point in time.

The results from the first experiment (Table 1) show the removal of substantial quantities of water (10% to 1.5%), with only a small reduction in HF concentration (40.8% to 39.2%). Subsequent experiments demonstrated that the final water content could be reduced below the 1.5% achieved in the first experiment ie 0.12% (Table 2) and 0.05% (Table 3). The corresponding loss of HF approximately 3%, which accompanied the removal of water is relatively small.

The results of these experiments suggest that the initial levels of water contamination can be substantial, without affecting the efficiency of the treatment process. However, the duration of the drying period appears to be directly proportional to the original concentration of water, with a constant nitrogen sparge rate, ie the greater the initial water content, the longer the drying time.

These experiments have shown that molten wet electrolyte can be subjected to a simple form of treatment which removes water without substantial loss of HF. A molten salt which approximates to KF.2HF is the final product, which is of n suitable quality for electrolysis ie with a water content of<0.2%.

In a further experiment a mixture comprising approximately 170 kg of the salt system KF.2HF and 30 kg water was treated by sparging with nitrogen in a 200 liter vessel held at approximately 85° C. After 100 hours sparging, at a nitrogen flow rate of 60 liters per minute, the water content of the mixture had been reduced to <0.5 percent by weight. The final HF content of the melt was approximately 37 percent by weight.

The dried molten salt was returned to the production plant and used as electrolyte for commercial scale fluorine electrolysis, without any problems.

In another experiment 1.6 kg of KF.HF was added to 1 kg of 40% aqueous HF and the mixture so formed was heated to a temperature of approximately 100° C. at which temperature a melt was formed. The melt was treated at this temperature by sparging with nitrogen gas. After 24 hours the water content had been reduced to less than 0.1% by weight. The final HF content in the melt was approximately 36.5% by weight. This experiment illustrates the highly beneficial use of the invention to convert aqueous HF into dry HF. The latter product may be separated in one of the ways described above.

We claim:

1. A process for the treatment of a mixture comprising an inorganic fluoride salt and hydrofluoric acid, wherein the mixture has an excess of hydrofluoric acid as compared with a stoichiometric composition according to the formula $MF_n.HF$ where M is a cation same as the cation of the inorganic fluoride salt and having a valency n, said mixture also comprising at least 0.2 weight percent water, the process comprising the steps of:

(a) forming a liquid phase of the mixture by melting the salt therein at an elevated temperature of at least 70° C.; and (b) feeding an inert gas through the liquid phase of the mixture to remove the water by physical forced evaporation at the elevated temperature.

2. The process as in claim 1 wherein said salt comprises potassium fluoride or ammonium fluoride or a mixture of fluorides containing one of these.

3. The process as in claim 1 wherein said mixture comprises an electrolyte system comprising KF.xHF where x is in the range from 1.8 to 2.2.

4. The process as in claim 1 wherein the melted salt is maintained at a temperature in the range from 80° C. to 100° C.

5. The process as in claim 1 wherein said inert gas is selected from the group consisting of nitrogen, compressed air and argon.

6. The process as in claim 1 wherein the water from the mixture arose from degradation by atmospheric moisture contamination.

7. The process as in claim 1 wherein said mixture is produced by adding together an aqueous solution of hydrofluoric acid and a dry mixed salt system of formula $MF_n.HF$ where M represents a cation and n is the valency of M.

8. The process as in claim 7 wherein $MF_n.HF$ is KF.HF.

9. The process as in claim 8 wherein the KF.HF and HF solution contains up to 40 percent by volume water.

10. The process as in claim 7 wherein after the water present has been removed from the mixture of said salt system and said hydrogen fluoride solution, components of the mixture are then separated to recover dry HF.

11. The process as in claim 10 wherein said separation is carried out by bubbling further gas through the liquid phase mixture and heating the liquid phase mixture to drive off or extract HF as a gas.

12. The process as in claim 10 wherein said separation is carried out by bubbling further gas through the liquid phase mixture to drive off or extract HF as a gas.

13. The process as in claim 10 wherein said separation is carried out by heating the liquid phase mixture to drive off or extract HF as a gas.

* * * * *